US012561347B2

(12) United States Patent
Fenton et al.

(10) Patent No.: US 12,561,347 B2
(45) Date of Patent: Feb. 24, 2026

(54) SYSTEM AND METHOD FOR AUTOMATICALLY EXTRACTING LATENT STRUCTURES AND RELATIONSHIPS IN DATASETS

(71) Applicant: TRUATA LIMITED, Dublin (IE)

(72) Inventors: Michael Fenton, Greystones (IE); Maurice Coyle, Dublin (IE)

(73) Assignee: TRUATA LIMITED, Sandyford Dublin (IE)

( * ) Notice: Subject to any disclaimer, the term of this patent is extended or adjusted under 35 U.S.C. 154(b) by 275 days.

(21) Appl. No.: 18/106,238

(22) Filed: Feb. 6, 2023

(65) Prior Publication Data

US 2024/0265037 A1      Aug. 8, 2024

(51) Int. Cl.
　　*G06F 16/00*　　(2019.01)
　　*G06F 16/22*　　(2019.01)
　　*G06F 16/28*　　(2019.01)
(52) U.S. Cl.
　　CPC ........ *G06F 16/288* (2019.01); *G06F 16/2246* (2019.01)
(58) Field of Classification Search
　　CPC .................................................. G06F 16/288
　　See application file for complete search history.

(56) References Cited

U.S. PATENT DOCUMENTS

2014/0236953 A1 * 8/2014 Rapaport ............. G06F 16/285
707/740

OTHER PUBLICATIONS

International Search Report and Written Opinion issued on Apr. 25, 2024 in related Application No. PCT/EP2024/052954, filed on Feb. 6, 2024.
Jin Cao et al: "A Lightweight Algorithm to Uncover Deep Relationships in Data Tables", arxiv.org, Cornell University Library, 201 Olin Library Cornell University, Sep. 7, 2020.

* cited by examiner

*Primary Examiner* — Ajith Jacob

(74) *Attorney, Agent, or Firm* — Pillsbury Winthrop Shaw Pittman LLP

(57)　　　　　ABSTRACT

The system and method provide for automatically extracting latent structures and relationships in datasets of any size, to enable effective management of that data. The system and method produce hierarchies of fields with relationships of a particular type and strength. The hierarchies of fields with relationships of a particular type and strength can be used to optimize the data storage profile of a company by separating large datasets into multiple smaller datasets, reducing operational costs, perform enhanced analysis of the data through a greater understanding of its internal logical structure, reduce privacy risk within the dataset by removing risky fields and substituting them in analytical processing with less risky fields that carry a similar amount of statistical information, to identify inference risks in the data to enable more effective data protection decision-making, and can be used to separate out wide datasets into multiple narrower/smaller datasets, thus aiding more efficient analytics.

20 Claims, 9 Drawing Sheets

300

| REGION | 310 | COUNTRY | 320 | CURRENCY | 330 |
|--------|-----|---------|-----|----------|-----|
| EUR | $310_1$ | FRA | $320_1$ | EUR | $330_1$ |
| EUR | $310_2$ | DEU | $320_2$ | EUR | $330_2$ |
| EUR | $310_3$ | IRE | $320_3$ | EUR | $330_3$ |

| TXN ID | DATE | TIME | CARD | UNIT PRICE | TAX | QTY | CATEGORY | SUB-CATEGORY | PRODUCT NAME | STREET ADDRESS | POSTCODE | LOCATION ID |
|---|---|---|---|---|---|---|---|---|---|---|---|---|
| 543345 | 03/02/2021 | 09:38 | 5010124899871600 | 28.99 | 3.7687 | 1 | CLOTHING | MEN'S CLOTHING | HOODED TRAINING TOP | 33 EAST WINDSOME STREET SOUTH | DX14 | 2134 |
| 564321 | 05/06/2021 | 13:56 | 374288931105794 | 1.05 | 0.1365 | 2 | GROCERY | DAIRY | FRESH MILK - HALF & HALF | 564 WAINCOURT ROAD | 5Y7F | 105 |
| 543345 | 03/02/2021 | 09:38 | 5010124899871600 | 75 | 9.75 | 1 | CLOTHING | MEN'S CLOTHING | CARGO PANTS | 10 Shop Street | DX14 | 85 |
| 543345 | 03/02/2021 | 09:38 | 5010124899871600 | 96.49 | 12.544 | 1 | CLOTHING | WOMEN'S CLOTHING | SKINNY JEANS | 33 EAST WINDSOME STREET SOUTH | DX14 | 2134 |
| 564321 | 05/06/2021 | 13:56 | 374288931105794 | 3.45 | 0.4485 | 3 | GROCERY | HOME BAKING | SELF-RAISING FLOUR | 564 WAINCOURT ROAD | 5Y7F | 426 |
| 522314 | 10/05/2021 | 17:01 | 5100139638941790 | 44.99 | 5.8487 | 2 | CLOTHING | WOMEN'S CLOTHING | WHITE BLOUSE | 1124 RIVER FALLS | G1FH | 5187 |
| 543345 | 03/02/2021 | 09:38 | 5010124899871600 | 93 | 12.09 | 1 | CLOTHING | WOMEN'S FOOTWEAR | BLACK HEELED | 33 EAST WINDSOME STREET SOUTH | DX14 | 2134 |
| 491211 | 04/04/2021 | 12:22 | 374288931105794 | 1.09 | 0.1417 | 4 | GROCERY | FRUIT & VEGETABLES | HASS AVOCADO | 564 WAINCOURT ROAD | 5Y7F | 426 |
| 491211 | 04/04/2021 | 12:22 | 374288931105794 | 1.09 | 0.1417 | 2 | GROCERY | FRUIT & VEGETABLES | HASS AVOCADO | 564 WAINCOURT ROAD | 5Y7F | 426 |
| 500134 | 09/02/2021 | 13:41 | 5108754167559380 | 28.99 | 3.7687 | 2 | CLOTHING | MEN'S CLOTHING | HOODED TRAINING TOP | 33 EAST WINDSOME STREET SOUTH | DX14 | 2134 |

600

605 610 615 620 625 630 635 640 645 650 655 660 665

<u>700</u>

<u>800</u>

900

910

920

| TXN ID | DATE | TIME | CARD | UNIT PRICE | TAX | QTY | PRODUCT ID | LOCATION ID |
|---|---|---|---|---|---|---|---|---|
| 543345 | 03/02/2021 | 09:38 | 5010124899871600 | 28.99 | 3.7687 | 1 | 1 | 2134 |
| 564321 | 05/06/2021 | 13:56 | 374288931105794 | 1.05 | 0.1365 | 2 | 2 | 105 |
| 543345 | 03/02/2021 | 09:38 | 5010124899871600 | 75 | 9.75 | 1 | 3 | 85 |
| 543345 | 03/02/2021 | 09:38 | 5010124899871600 | 96.49 | 12.544 | 1 | 4 | 2134 |
| 564321 | 05/06/2021 | 13:56 | 374288931105794 | 3.45 | 0.4485 | 3 | 5 | 426 |
| 522314 | 10/05/2021 | 17:01 | 5100139638941790 | 44.99 | 5.8487 | 2 | 6 | 5187 |
| 543345 | 03/02/2021 | 09:38 | 5010124899871600 | 93 | 12.09 | 1 | 7 | 2134 |
| 491211 | 04/04/2021 | 12:22 | 374288931105794 | 1.09 | 0.1417 | 4 | 8 | 426 |
| 491211 | 04/04/2021 | 12:22 | 374288931105794 | 1.09 | 0.1417 | 2 | 8 | 426 |
| 500134 | 09/02/2021 | 13:41 | 5108754167559380 | 28.99 | 3.7687 | 2 | 1 | 2134 |

FIG. 9

| PRODUCT ID | CATEGORY | SUB-CATEGORY | PRODUCT NAME |
|---|---|---|---|
| 1 | CLOTHING | MEN'S CLOTHING | HOODED TRAINING TOP |
| 2 | GROCERY | DAIRY | FRESH MILK - HALF & HALF |
| 3 | CLOTHING | MEN'S CLOTHING | CARGO PANTS |
| 4 | CLOTHING | WOMEN'S CLOTHING | SKINNY JEANS |
| 5 | GROCERY | HOME BAKING | SELF-RAISING FLOUR |
| 6 | CLOTHING | WOMEN'S CLOTHING | WHITE BLOUSE |
| 7 | CLOTHING | WOMEN'S FOOTWEAR | BLACK HEELED |
| 8 | GROCERY | FRUIT & VEGETABLES | HASS AVOCADO |

| LOCATION ID | STREET ADDRESS | POSTCODE |
|---|---|---|
| 426 | 564 WAINCOURT ROAD | 5Y7F |
| 2134 | 33 EAST WINDSOME STREET SOUTH | DX14 |
| 5187 | 1124 RIVER FALLS | G1FH |
| 85 | 10 Shop Street | DX14 |
| 105 | 564 WAINCOURT ROAD | 5Y7F |

SET THRESHOLD VALUE
1210

FOR EACH COLUMN A
IN THE DATA     1220

FOR EACH COLUMN B
IN THE DATA     1230

EXTRACT CORR (A,B)     1240

IF CORR (A, B) ≥ THRESHOLD     1250

EXTRACT CORR (B,A)     1260

IF CORR (A, B) > CORR (B, A)     1270

ADD COLUMN B AS CHILD O COLUMN A     1280

SYSTEM AND METHOD FOR AUTOMATICALLY EXTRACTING LATENT STRUCTURES AND RELATIONSHIPS IN DATASETS

FIELD OF INVENTION

A system and method for extracting latent structures and relationships in datasets is provided. More specifically, a system and method for automatically providing their identification and extraction is provided.

BACKGROUND

In the modern age of "big data", datasets can be highly complex entities, often reaching Terabyte and even Petabyte levels of size. In the age of machine-generated data, not only are modern datasets getting "longer" (i.e., more rows), but increasingly datasets are now getting "wider" with the addition of more and more fields. This is compounded within organizations of a particular size, where there are many data silos and cataloguing or managing all of the organization's data is extremely difficult, if not impossible. Modern data applications are founded on a deep understanding of not only the format and structure of the data, but also of the statistical relationships between the various fields. Understanding the latent structure and relationships between vast numbers of fields in very wide datasets is becoming an increasingly difficult task and requires significant domain knowledge and expertise.

A common technique used for understanding relationships between individual fields within a dataset is to use varying forms of statistical correlation measurements that give an indication of the strength of relationship between fields. However, given a dataset with a large number of fields it may be difficult to infer any meaningful relationships even when given such a full pairwise correlation matrix. This means that for tasks where an understanding of such relationships is critical, a new problem arises in that the sheer size of the data may prove prohibitive to such understanding.

SUMMARY

The system and method provide for automatically extracting latent structures and relationships in datasets of any size, to enable effective management and use of that data. The system and method produce hierarchies of fields with relationships of a particular type and strength. The hierarchies of fields with relationships of a particular type and strength can be used to optimize the data storage profile of a company by separating large datasets into multiple smaller datasets, thus reducing operational costs. The hierarchies of fields can be used to perform enhanced analysis of the data through a greater understanding of its internal logical structure. The hierarchies of fields can be used to reduce privacy risk within the dataset by removing risky fields and substituting them in analytical processing with less risky fields that carry a similar amount of statistical information. The hierarchies of fields can be used to identify inference risks in the data to enable more effective data protection decision-making. The hierarchies of fields can be used to identify fields that act as a primary key or identifier for data subjects or records. The hierarchies of fields can be used to identify and pinpoint data quality issues. The hierarchies of fields can be used to automatically create new generalization hierarchies via the use of transformations. The hierarchies of fields can be used to separate out wide datasets into multiple narrower/smaller datasets, thus aiding more efficient analytics. The hierarchies of fields can be used to automatically convert a dataset that comprises just one large table into a relational database with several distinct tables.

A system and method for automatically extracting latent structures and relationships in datasets is disclosed. The system and method include extracting a first correlation between a first field and a second field, comparing the extracted first correlation to a threshold, if the compared extracted first correlation is greater than or equal to the threshold, extracting a second correlation of the second field to the first field, and if the first correlation is greater than the second correction, identifying the second field as a child of the first field.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 6 illustrates an example table with additional complexity to the table of FIG. 3;

FIG. 9 represents a first table of the three tables derived from the information hierarchies of FIGS. 7 and 8 and the original table of FIG. 6;

FIG. 10 illustrates a product information table including the product ID of FIG. 9 with category of FIG. 6, subcategory of FIG. 6 and product name of FIG. 6;

FIG. 11 illustrates a location information table including the location ID of FIG. 9 with street address of FIG. 6 and postcode of FIG. 6.

DETAILED DESCRIPTION

The system and method provide for automatically extracting latent structures and relationships in datasets of any size, to enable effective management and use of that data. The system and method produce hierarchies of fields with relationships of a particular type and strength. The hierarchies of fields with relationships of a particular type and strength can be used to optimize the data storage profile of a company by separating large datasets into multiple smaller datasets, thus reducing operational costs. The hierarchies of fields can be used to perform enhanced analysis of the data through a greater understanding of its internal logical structure. The hierarchies of fields can be used to reduce privacy risk within the dataset by removing risky fields and substituting them in analytical processing with less risky fields that carry a similar amount of statistical information. The hierarchies of fields can be used to identify inference risks in the data to enable more effective data protection decision-making. The hierarchies of fields can be used to identify fields that act as a primary key or identifier for data subjects. The hierarchies of fields can be used to identify and pinpoint data quality issues. The hierarchies of fields can be used to automatically create new generalization hierarchies via the use of transformations. The hierarchies of fields can be used to separate out wide datasets into multiple narrower/smaller datasets, thus aiding more efficient analytics. The hierarchies of fields can be used to automatically convert a dataset that comprises just one large table into a relational database with several distinct tables.

The system and method produce and/or identify hierarchical structures where the relationships between data fields are determined based on the nature or strength of the relationship between the data fields.

Figure 1:
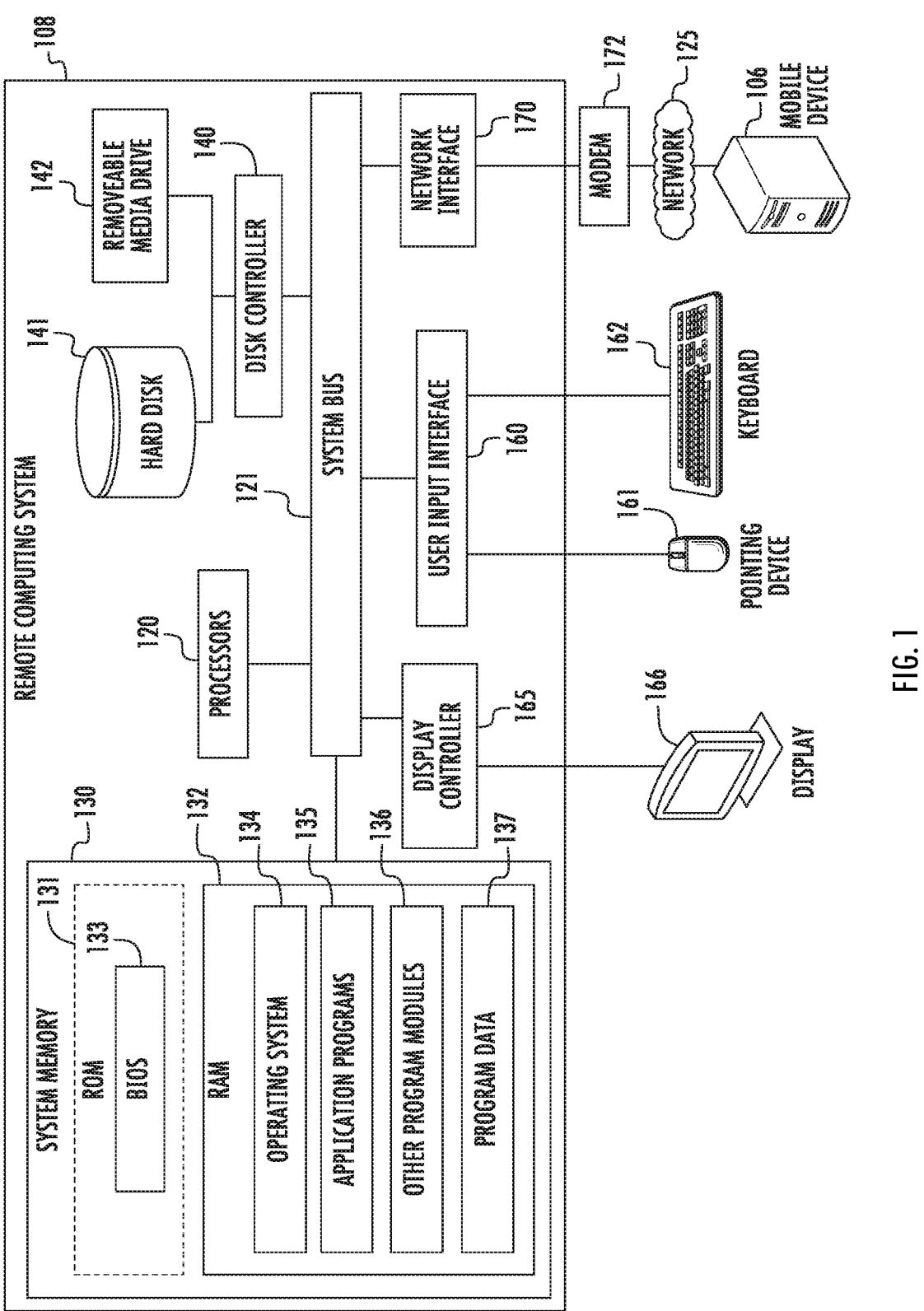
FIG. 1 is a system diagram of an example of a computing environment in communication with a network.

FIG. 1 is a system diagram of an example of a computing environment 100 in communication with a network. In some instances, the computing environment 100 is incorporated in a public cloud computing platform (such as Amazon Web Services or Microsoft Azure), a hybrid cloud computing platform (such as HP Enterprise OneSphere) or a private cloud computing platform. As shown in FIG. 1, computing environment 100 includes remote computing system 108 (hereinafter computer system), which is one example of a computing system upon which embodiments described herein may be implemented.

The remote computing system 108 may, via processors 120, which may include one or more processors, perform various functions. The functions may be broadly described as those governed by machine learning techniques. Generally, any problems that can be solved within a computer system. As described in more detail below, the remote computing system 108 may be used to provide (e.g., via display 166) users with a dashboard of information, such that such information may enable users to identify and prioritize models and data as being more critical to the solution than others.

As shown in FIG. 1, the computer system 108 may include a communication mechanism such as a bus 121 or other communication mechanism for communicating information within the computer system 108. The computer system 108 further includes one or more processors 120 coupled with the bus 121 for processing the information. The processors 120 may include one or more CPUs, GPUs, or any other processor known in the art.

The computer system 108 also includes a system memory 130 coupled to the bus 121 for storing information and instructions to be executed by processors 120. The system memory 130 may include computer readable storage media in the form of volatile and/or nonvolatile memory, such as read only system memory (ROM) 131 and/or random-access memory (RAM) 132. System memory 130 may contain and store the knowledge within the system. The system memory RAM 132 may include other dynamic storage device(s) (e.g., dynamic RAM, static RAM, and synchronous DRAM). The system memory ROM 131 may include other static storage device(s) (e.g., programmable ROM, erasable PROM, and electrically erasable PROM). In addition, the system memory 130 may be used for storing temporary variables or other intermediate information during the execution of instructions by the processors 120. A basic input/output system 133 (BIOS) may contain routines to transfer information between elements within computer system 108, such as during start-up, that may be stored in system memory ROM 131. RAM 132 may comprise data and/or program modules that are immediately accessible to and/or presently being operated on by the processors 120. System memory 130 may additionally include, for example, operating system 134, application programs 135, other program modules 136 and program data 137.

The illustrated computer system 108 also includes a disk controller 140 coupled to the bus 121 to control one or more storage devices for storing information and instructions, such as a magnetic hard disk 141 and a removable media drive 142 (e.g., floppy disk drive, compact disc drive, tape drive, and/or solid-state drive). The storage devices may be added to the computer system 108 using an appropriate device interface (e.g., a small computer system interface (SCSI), integrated device electronics (IDE), Universal Serial Bus (USB), or FireWire).

The computer system 108 may also include a display controller 165 coupled to the bus 121 to control a monitor or display 166, such as a cathode ray tube (CRT) or liquid crystal display (LCD), for displaying information to a computer user. The illustrated computer system 108 includes a user input interface 160 and one or more input devices, such as a keyboard 162 and a pointing device 161, for interacting with a computer user and providing information to the processor 120. The pointing device 161, for example, may be a mouse, a trackball, or a pointing stick for communicating direction information and command selections to the processor 120 and for controlling cursor movement on the display 166. The display 166 may provide a touch screen interface that may allow inputs to supplement or replace the communication of direction information and command selections by the pointing device 161 and/or keyboard 162.

The computer system 108 may perform a portion or each of the functions and methods described herein in response to the processors 120 executing one or more sequences of one or more instructions contained in a memory, such as the system memory 130. These instructions may include the flows of the machine learning process(es) as will be described in more detail below. Such instructions may be read into the system memory 130 from another computer readable medium, such as a hard disk 141 or a removable media drive 142. The hard disk 141 may contain one or more data stores and data files used by embodiments described herein. Data store contents and data files may be encrypted to improve security. The processors 120 may also be employed in a multi-processing arrangement to execute the one or more sequences of instructions contained in system memory 130. In alternative embodiments, hard-wired circuitry may be used in place of or in combination with software instructions. Thus, embodiments are not limited to any specific combination of hardware circuitry and software.

As stated above, the computer system 108 may include at least one computer readable medium or memory for holding instructions programmed according to embodiments described herein and for containing data structures, tables, records, or other data described herein. The term computer readable medium as used herein refers to any non-transitory, tangible medium that participates in providing instructions to the processor 120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 141 or removable media drive 142. Non-limiting examples of volatile media include dynamic memory, such as system memory 130. Non-limiting examples of transmission media include coaxial cables, copper wire, and fiber optics, including the wires that make up the bus 121. Transmission media may also take the form of acoustic or light waves, such as those generated during radio wave and infrared data communications.

The computing environment 100 may further include the computer system 108 operating in a networked environment using logical connections to local computing device 106 and one or more other devices, such as a personal computer (laptop or desktop), mobile devices (e.g., patient mobile devices), a server, a router, a network PC, a peer device or other common network node, and typically includes many or all of the elements described above relative to computer system 108. When used in a networking environment, computer system 108 may include modem 172 for establishing communications over a network, such as the Internet. Modem 172 may be connected to system bus 121 via network interface 170, or via another appropriate mechanism.

Network 125, as shown in FIG. 1, may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 108 and other computers (e.g., local computing device 106).

Figure 2:
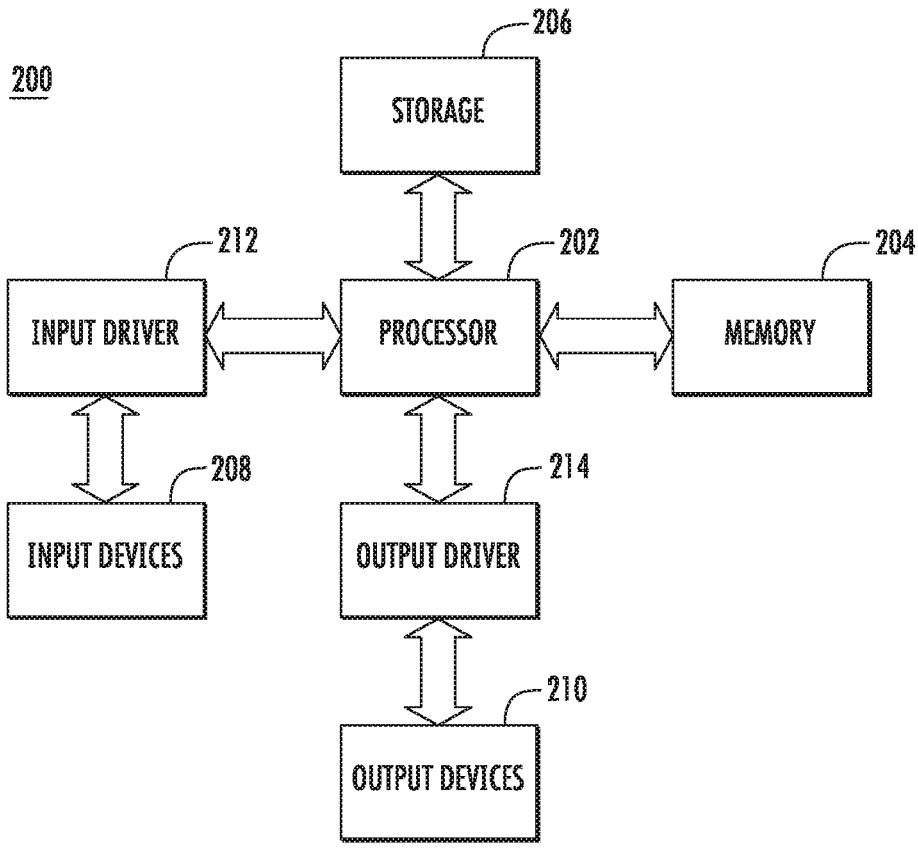
FIG. 2 is a block diagram of an example device in which one or more features of the disclosure can be implemented.

FIG. 2 is a block diagram of an example device 200 in which one or more features of the disclosure can be implemented. The device 200 may be local computing device 106, for example. The device 200 can include, for example, a computer, a gaming device, a handheld device, a set-top box, a television, a mobile phone, or a tablet computer. The device 200 includes a processor 202, a memory 204, a storage device 206, one or more input devices 208, and one or more output devices 210. The device 200 can also optionally include an input driver 212 and an output driver 214. It is understood that the device 200 can include additional components not shown in FIG. 2 including an artificial intelligence accelerator.

In various alternatives, the processor 202 includes a central processing unit (CPU), a graphics processing unit (GPU), a CPU and GPU located on the same die, or one or more processor cores, wherein each processor core can be a CPU or a GPU. In various alternatives, the memory 204 is located on the same die as the processor 202, or is located separately from the processor 202. The memory 204 includes a volatile or non-volatile memory, for example, random access memory (RAM), dynamic RAM, or a cache.

The storage device 206 includes a fixed or removable storage means, for example, a hard disk drive, a solid-state drive, an optical disk, or a flash drive. The input devices 208 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 210 include, without limitation, a display, a speaker, a printer, a haptic feedback device, one or more lights, an antenna, or a network connection (e.g., a wireless local area network card for transmission and/or reception of wireless IEEE 802 signals).

The input driver 212 communicates with the processor 202 and the input devices 208, and permits the processor 202 to receive input from the input devices 208. The output driver 214 communicates with the processor 202 and the output devices 210, and permits the processor 202 to send output to the output devices 210. It is noted that the input driver 212 and the output driver 214 are optional components, and that the device 200 will operate in the same manner if the input driver 212 and the output driver 214 are not present.

Information hierarchies are recursive directed graph tree views over an asymmetrical pairwise correlation matrix, where graph edges between nodes (fields) are defined by correlation values greater than or equal to a configured threshold value, T. The directed nature of the graph/trees means that in order for field A to have field B as a child within an information hierarchy tree, field A must have a correlation score with field B that is greater than or equal to the threshold value, T. Furthermore, the correlation score of the reverse relationship from field B to the original field A must be less than the initial correlation measure from A to B. While the description uses the term field, a field can include or define a column or row of data, for example. Some of the examples included herein include data in columns, but those are illustrative only and data may be defined in any form. Field may also include non-columnar data representations like json files, etc., that have a common structure. Field may also define generally a data field, or field of data. Further, while the present description uses the term correlation, which is understood to include a mathematical/statistical relationship, this term correlation may be generally defined to include a relationship of any kind including, but not limited to, a mathematically calculated relationship, and/or an intuitive ordering, etc.

When the threshold is set to its maximum possible value (e.g. 100%), the information hierarchies describe fields that have perfect (100%) correlation with other fields in the data, but which have an imperfect correlation score in the reverse direction. This means that for any field A that has an information hierarchy tree, there is at least one other field, B, in the data that has a perfect many-to-1 mapping relationship, i.e., many values in field A perfectly map to or correlate with a single value in field B with a 100% correlation score. In effect, this means knowing a value in field A enables the corresponding value in field B to automatically be known. However, the reverse is not necessarily true, knowing the value of field B does not automatically correlate to knowing the corresponding value of field A due to the many-to-1 mapping relationship between field A and field B. This property is possible with an asymmetrical pairwise correlation measurement. The information hierarchy trees essentially describe groups of fields where each node in a branch both contains less information than its parent and perfectly maps to its parent (depending on the configured information hierarchy threshold value).

Automatically identifying the information hierarchies in any dataset enables the system and method to better equip data governance and data analyst functions to manage and analyze the vast quantities of data that they control. This leads to greater confidence and ability to manage and make effective decisions around the use and handling of datasets.

Figures 3, 4, 5:
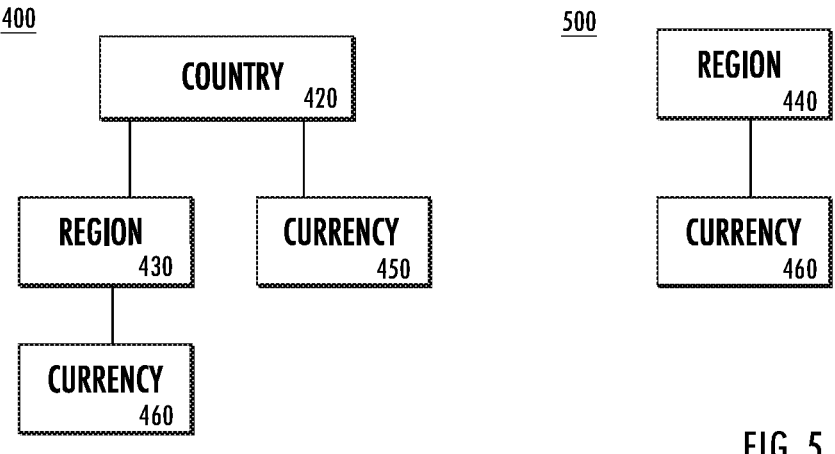
FIG. 3 illustrates a simple example table.
FIG. 4 illustrates an information hierarchy tree for the country field from the data of FIG. 3.
FIG. 5 illustrates an information hierarchy tree for the region field from the data of FIG. 3.

FIG. 3 illustrates a simple example table 300. Table 300 includes an arbitrary set of fields for region 310, country 320, and currency 330. In this table, every country 320 maps to exactly one region 310 with perfect 100% accuracy. For example, FRA 3201, DEU 3202, and IRE 320; map to EUR 3101, 3102, 3103. However, every region 310 has multiple countries 320. Therefore, there exists a perfect many-to-1 mapping between country 320 and region 310. The correlation score between country 320 and region 310 is 100%, but the correlation score between region 310 and country 320 is less than 100%. The information hierarchy shown in FIG. 4 400 includes country 320 with region 310 as one of its children.

For the most part, each country 320 has one currency 330. Also, let us assume for the purposes of this example that each region 310 also only has one currency 330 (in reality, each currency can have multiple regions and multiple countries). Currency 330 is a child node of both region 310 and country 320 in FIG. 4 400.

FIG. 4 illustrates an information hierarchy tree 400 for Country 320 from the data of FIG. 3. Tree 400 includes at the root node Country 420. Under Country 420 is Region 430 with Currency 460 below Region 430, and Currency 450 directly below Country 420. This tree exemplifies the fact that if Country 420 is known, Region 430 and Currency 450 are also known, and Currency 450 is known from Country 420.

FIG. 5 illustrates an information hierarchy tree 500 for Region 310 from the data of FIG. 3. Tree 500 is identical to the region sub-tree in tree 400 of FIG. 4. Tree 500 includes at the root node region 440 with currency 460 below region 440. This tree exemplifies the fact that if the region 440 is known, currency 460 is also known.

Figures 7, 8:
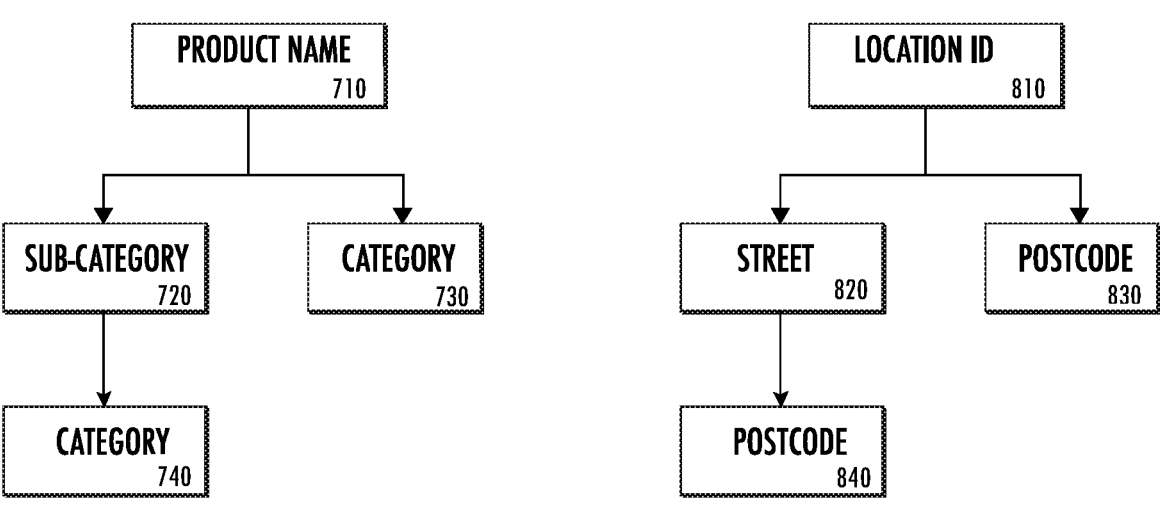
FIG. 7 illustrates an information hierarchy tree for the product name field from the data of FIG. 6.
FIG. 8 illustrates an information hierarchy tree for the location ID field from the data of FIG. 6.

FIG. 6 illustrates an example table 600 with additional complexity to the table 300 of FIG. 3. Table 600 depicts an arbitrary dataset containing records for transactions within a chain of department stores. The dataset of table 600 with information about the Txn ID 605, Date 610, Time 615, Card 620, Unit Price 625, Tax 630, Qty (quantity) 635, Category (of goods) 640, Sub-category 645, Product name 650, Street Address (of store) 655, Postcode (of store) 660, and Location ID 665. Table 600 may be used as an input dataset to automatically identify information hierarchies. The information hierarchies identified, by example, relate to product and location information as illustrated in FIGS. 7-8. In any table or dataset, there may be many information hierarchy trees and in this instance we are selecting 2 example trees for illustrative purposes. Also, where two fields have a perfect 1-to-1 correlation, the fields can be substituted in information hierarchy trees, i.e., in FIG. 7 information hierarchy tree 700 (described below) Product name 650 may be replaced with Unit Price 625 since those two fields have a perfect correlation in the table 600.

FIG. 7 illustrates an information hierarchy tree 700 for Product name 650 from the data of FIG. 6. Information hierarchy tree 700 includes at the root node Product name 710. Under Product name 710 is Sub-category 720 with Category 740 below Sub-category 720, and Category 730 directly below Product name 710. Similarly to FIG. 4 and FIG. 5, information hierarchy tree 700 exemplifies the fact that if Product name 710 is known, Sub-category 720 and Category 730 are also known, and Category 740 is known from Sub-category 720.

FIG. 8 illustrates an information hierarchy tree 800 for Location ID 665 from the data of FIG. 6. Information hierarchy tree 800 includes at the root node Location ID 810. Under Location ID 810 is Street 820 with Postcode 840 below Street 820, and Postcode 830 directly below Location ID 810. As with the other figures, information hierarchy tree 800 exemplifies the fact that if Location ID 810 is known, Street 820 and Postcode 830 are also known, and Postcode 840 is known from Street 820.

From the information hierarchy trees 700, 800 the original table 600 of FIG. 6 may be divided into three tables. FIG. 9 represents a first table 900 of the three tables. First table 900 contains the original transactional information from table 600 of FIG. 6, with fields relating to information hierarchy trees 700 (Product name) and 800 (Location ID) being removed save for the root nodes of the respective hierarchy trees. That is, Product name 650 of FIG. 6 has been replaced with product ID 910 and Category 640 of FIG. 6 and Sub-category 645 of FIG. 6 have both been removed. Product ID 910 is a simple numeric representation of Product name 650, generated for the purposes of creating a foreign key which is a more space-efficient way of linking records across tables. If storage space is not an issue, Product name 650 of FIG. 6 may be retained and used as the foreign key for the product information table 1000 shown in FIG. 10. Similarly, Location ID 665 of FIG. 6 is retained as location ID 920, but both Street Address 655 of FIG. 6 and Postcode 660 of FIG. 6 have been removed. Table 900 (FIG. 9) therefore represents an optimized, narrow version of Table 600 (FIG. 6) with reduced storage space requirements.

FIG. 10 illustrates a product information table 1000 including the Product ID 910 of FIG. 9 with Category 640 of FIG. 6, Sub-category 645 of FIG. 6 and Product name 650 of FIG. 6. Table 1000 is generated from the information hierarchy tree 700 based on Product name, with Product ID generated as a unique number for each individual product. The information hierarchy tree 700 in FIG. 7 shows that every unique Product name 710 in FIG. 7 (and 650 in FIG. 6) maps with perfect correlation to a unique Sub-category 720 in FIG. 7 (and 645 in FIG. 6) and also to a unique Category 730 in FIG. 7 (and 640 in FIG. 6). Similarly, every Sub-category 720 in FIG. 7 (and 645 in FIG. 6) maps with perfect correlation to a unique Category 740 in FIG. 7 (and 640 in FIG. 6). It can be observed from FIG. 6 that the reverse relationship does not have perfect correlation, i.e. each Sub-category 645 may relate to multiple Product names 650 and each Category 640 may relate to multiple Sub-categories 645. Therefore, Table 1000 in FIG. 10 is merely the tabular realization of that extracted relational mapping. In this manner, Product ID 910 in FIG. 9 can be used as a foreign key to join between table 900 and table 1100 to retrieve all of the original product information from the original Table 6 600, thus demonstrating that all information has been retained but that the data size has been effectively reduced and more efficiently structured.

FIG. 11 illustrates a location information table 1100 including the Location ID 920 of FIG. 9 with Street Address 655 of FIG. 6 and Postcode 660 of FIG. 6. Table 1100 is generated from the information hierarchy tree 800 of FIG. 8 based on Location ID. The information hierarchy tree 800 in FIG. 8 shows that every unique Location ID 810 in FIG. 8 (and 665 in FIG. 6) maps with perfect correlation to a unique Street Address 820 in FIG. 8 (and 655 in FIG. 6) and also to a unique Postcode 830 in FIG. 8 (and 660 in FIG. 6), and similarly that every Street Address 820 in FIG. 8 (and 665 in FIG. 6) maps with perfect correlation to a unique Postcode 840 in FIG. 8 (and 660 in FIG. 6). It can be observed from FIG. 6 that the reverse relationship does not have perfect correlation, i.e. each Street Address 655 may relate to multiple Location IDs 665 (e.g. a shopping mall) and each Postcode 660 may relate to multiple Street Addresses 655. Table 1100 in FIG. 11 is merely the tabular realization of that extracted relational mapping. In this manner, Location ID 920 in FIG. 9 can be used as a foreign key to join between table 900 and table 1100 to retrieve all of the original location information from the original Table 6 600, thus demonstrating that all information has been retained but that the data size has been effectively reduced and more efficiently structured.

In the example hierarchy of FIGS. 6-11, the system described here enables more effective management of the retail dataset. By removing duplicated fields, the original transaction table's size is reduced by approximately 46%, which constitutes a significant saving on data storage and the resulting costs. This is also a more efficient table structure in FIGS. 10 and 11 as compared to FIG. 6, allowing centralized maintenance and updating of product information in FIG. 10 or location information in FIG. 11, as well as improved analysis of each.

Where the distance between the levels of an information hierarchy in the input dataset is too great, the system can augment the dataset by adding new fields with new intermediate values of the hierarchy. As an example, in a database, which includes continent and city name as fields, a benefit can be gained by adding a new hierarchy level between the continent and city fields representing the country in which the city is located. This additional field can be achieved utilizing different methods. In one such method, an additional field can be added via a look-up table that map each car model to its respective vehicle category for a motoring dataset, e.g., tiny, small, medium, large, electric, van, SUV, vintage, and the like. In another method, additional fields may be added by masking existing values in the database, e.g., masking the precise postcode of a building D18A7K7 to get the value D18 representing an entire suburb, as a new additional hierarchy value between the County and the building.

Since each node may have an information hierarchy tree of its own, and since all sub-trees in a given tree exist as standalone trees in their own right, filtering the full set of information hierarchy trees may be prudent in order to find exclusive, non-overlapping trees. These non-overlapping trees are in effect the superset of all information hierarchy trees that exist for a dataset at a given threshold value.

A given tree can be considered an exclusive tree if its root node does not exist as a child node in any other tree in the dataset. There can exist multiple exclusive trees for any given dataset. In the above examples in FIGS. 3-5 and FIGS. 6-11, the full tree 400 for Country 420 is an exclusive hierarchy tree, as Country 420 does not exist as a child node in any other tree. However, since Region 310 exists as both the root (Region 440) of its own tree 500 and as a child node (Region 430) within the overall Country tree 400, the standalone Region tree 500 is not an exclusive tree as the entire Region tree 500 is encompassed in the Country tree 400.

The roots of exclusive information hierarchies in a dataset can indicate which hierarchy is most useful in a given context, allowing reduced tables as in the example of FIGS. 6-11. For example, the analyst or data governance personnel using the system may be interested in one or more particular information hierarchies depending on the use case at hand or desired space/structural efficiencies. For example, root nodes of exclusive trees can be viewed as the most granular form of data contained in that tree, while leaf nodes can be viewed as the most general/least granular form.

Information hierarchies are calculated for each field in the data based on the correlation scores for that field with all other fields in the data. Because of the recursive nature of the information hierarchy building method, any sub-tree within a given information hierarchy tree is identical to the main tree for that field. For example, if field A has children B and C, and the child node B of parent A has children D, E, and F, then there exists a standalone tree for field B with no parent, and with children D, E, and F.

Figure 12:
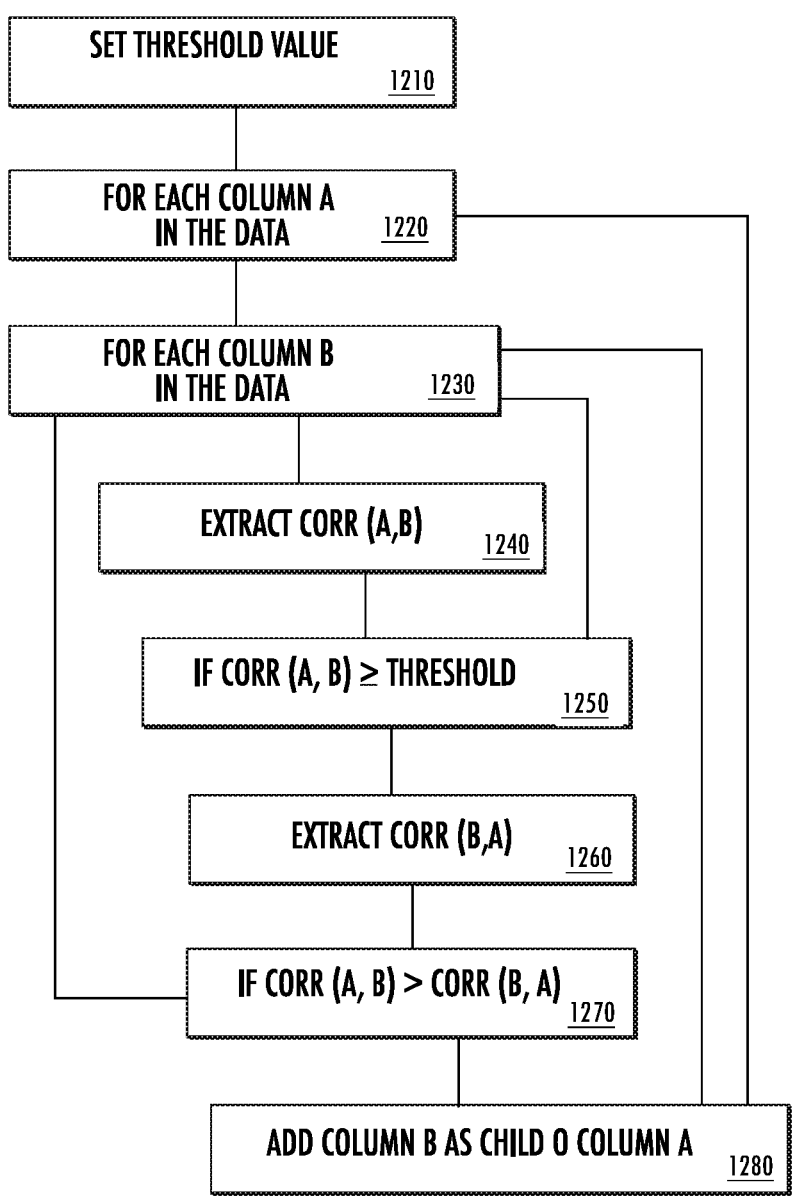
FIG. 12 illustrates a flow diagram of a method for building information hierarchy trees according to an embodiment.

FIG. 12 illustrates a flow diagram of a method 1200 for building information hierarchy trees according to an embodiment. Method 1200 includes setting a threshold value at step 1210. This threshold is determined based on the desired strength of correlation between parent and child nodes in the information hierarchy tree. A value of 1 for this threshold ensures a perfect correlation exists between each parent and child node. At step 1220, for each FIELD A in the data steps 1230-1280 are performed. At step 1230, for each FIELD B in the data steps 1240-1270 are performed. Method 1200 extracts or calculates the correlation of (A,B) at step 1240. Method 1200 continues at step 1250 to determine if the correlation of (A,B) is greater than or equal to the threshold set in step 1210. If the correlation of (A,B) is less than the threshold set in step 1210, field B is not added as a child of A and the next field is considered at step 1230. Based on the check in step 1250, depending on the value of the information hierarchy threshold, not all fields have an information hierarchy tree. In general, higher threshold values yield both fewer information hierarchy trees and generally smaller information hierarchy trees. If the determination of step 1250 is affirmative, at step 1260 method 1200 continues by extracting or calculating the correlation of (B,A). Method 1200 continues at step 1270 to determine if the correlation of (A,B) of step 1240 is greater than the correlation of (B,A) of step 1260. If the correlation of (A,B) of step 1240 is less than or equal to the correlation of (B,A) of step 1260 at step 1270, field B is not added as a child of field A in an information hierarchy tree and the next field is considered at step 1230. If the determination of step 1270 is affirmative, at step 1280 method 1200 continues to add FIELD B as a child of FIELD A. Method 1200 then recursively repeats method 1200 for all fields in the dataset. Method 1200 may have a computational complexity factor of $O(N^2)$ for all N fields within a dataset. Efficiencies to method 1200 to reduce its computational complexity may be introduced, by pre-calculating all or selective pairwise correlations in a distributed fashion and introducing heuristics such as ignoring perfectly correlated field pairings.

The present system and method may be used in a number of situations. For example, the present system and method may be useful in data storage optimization, field substitution, field generalization, data minimization, direct mapping, data subject key hierarchy trees, detection of primary and secondary data subject keys with known data subject keys, and detection of previously unknown data subject keys.

For data storage optimization, in the age of connected devices, the internet of things (IoT), and ubiquitous sensors, data volumes are ever increasing. With increasing data, opportunities to reduce storage requirements and therefore optimize operational overheads can lead to significant cost savings. In one example, the system and method can be utilized to automatically split a large (wide) dataset into multiple smaller datasets. An information hierarchy tree where the root node of the tree has a lower cardinality than the overall length of the data can be automatically extracted from the main data and stored separately in a more concise form, with the root node of the tree or a generated numerical index for the root node acting as a foreign key allowing for re-joining back to the main table. Since the root node has a lower cardinality than the overall length of the original data, the data identified by extracted tree can be stored using fewer rows than the original table, thus saving storage requirements.

For field substitution, and due to the hierarchical, directed, and asymmetrical nature of the information hierarchy trees, in one example a field which exists as a child node in an information hierarchy tree may be substituted with a other node higher up in the same branch (i.e., one of its parent nodes), as parent nodes contain more information than their children (provided the threshold value is set at or close to 1). When privacy risk scores or quality scores are known for each field, this substitution can improve the privacy risk and analytical outcomes for a dataset and enable either manual or automated dataset optimization, for example. Conversely, substituting a root node of an information hierarchy tree with one of its child nodes generalizes that field, thus reducing specificity but also potentially increasing privacy protection.

For data minimization, depending on the makeup of the data itself, in one example, the overall number of fields in the original dataset may be reduced through application of structures identified by the information hierarchy trees. By dropping fields which are children of other fields, the root parent field of any tree remains. This would be of particular interest in applications such as feature selection for machine learning or data minimization for privacy or data volume reduction applications, for example.

For direct mapping inference privacy risk, in one example, information hierarchy trees are an intuitive visual way to see direct mapping inference risk within the data. Depending on the value of the configured information hierarchy threshold, any field that has an information hierarchy tree may pose a direct mapping inference risk, depending on the number of other fields that can be directly inferred from the given field, and the sensitivity or re-identification capability of the inferred fields. Information hierarchy trees are a way to visualize these direct mapping relationships between different fields within the data.

For data subject key hierarchy trees, in one example, an information hierarchy tree that contains a field that uniquely identifies a data subject (hereafter referred to as a "Data Subject Key") within a branch may occur. The distinction between "primary" and "secondary" data subject keys in the data is one that can potentially be measured by information hierarchy trees. A data subject key can often be present as the root of an information hierarchy tree (i.e., appearing at the "top" of the tree, as a node with children but with no parent). Some fields may therefore have a many-to-1 mapping with the data subject, where many data subjects map to a single field in other fields. Examples of this situation may include a credit card field as the data subject key, and things like issuer banks, issuer country codes, currency codes, etc., as the other fields. Every credit card has exactly one issuer bank, country, currency, etc., but each bank/country/currency has multiple credit cards. The issuer bank, country, and currency fields are aggregated/less granular aspects of the card number due to this relationship. This is the standard way to imagine relationships in the data, and how the information hierarchies work.

The above example considers the case where the data subject key (e.g., the card number) is at the root of the tree (e.g., many data subjects perfectly map to single values of one or more child nodes). Other situations may exist in the reverse situation, with another field where multiple values perfectly map to a single data subject, when a data subject key is not at the root of the hierarchy tree, but is a child of another node. In such configurations, information hierarchy trees have detected/uncovered/measured a distinction between "primary" and "secondary" data subject keys within the data.

For detection of primary and secondary data subject keys with known data subject keys the following analysis exists. A "primary" data subject key in a dataset with multiple data subject keys is the data subject key with the lowest cardinality. Any other data subject key field with a higher cardinality is likely to be a "secondary" data subject key. By definition, each unique value in a data subject key field must identify a single data subject (i.e., a perfect mapping). If there exists two data subject key fields, but one has a higher cardinality than the other, then by this definition both fields must uniquely identify the same data subject, but the one with a higher cardinality would imply a many-to-1 mapping with the data subject (a single person with a single phone number may have multiple online usernames that are unique to them).

As an example, consider the difference between Social Security Numbers (SSNs) and email addresses. As a general rule, each person will only ever have a single SSN, but a person can set up as many email addresses as they like. Both fields directly and uniquely identify the data subject, and therefore should be considered data subject keys, but one has a 1-to-1 mapping while the other has a many-to-1 mapping. Therefore, in an event-level dataset containing both SSN and email address fields, the SSN may be considered the "primary" data subject key, while the email is considered a "secondary" data subject key.

This relationship is included in the information hierarchy trees, as a tree will exist with the email address field as its root and the SSN field as a child node of email address. This means that the SSN has a perfect 1-to-many mapping with the email address field (i.e., each SSN may have multiple email addresses, but each email address maps to a single SSN). The fact that the SSN is a child node of the email address field necessarily means that the SSN field has a lower cardinality than the email address, but since both are data subject keys, and both perfectly map to the data subject, the SSN is the "primary" data subject key. The social security number may have multiple other non-data subject key children such as with the credit card example above, as can the email address. The fact that a known data subject key field exists in an information hierarchy tree is of interest and it is the child of another node.

In the detection of previously unknown data subject key example, from the above description of the difference between primary and secondary data subject keys evident in the information hierarchy trees, an interesting secondary use case emerges where the information hierarchy trees (and perfect 1-to-1 correlations) can potentially allow the user to detect previously unknown data subject keys in the data. An example is where there is a perfect 1-to-1 correlation between a known data subject key field (e.g., SSN) and another categorical field that is not listed as a data subject key. This provides an example of detection of a previously unknown field which is a tokenized/obfuscated/non-raw or even potentially plaintext data subject key. The above simple 1-to-1 matching case is captured between two fields where the pairwise correlation between the two is exactly 1, and therefore while this case is evident from the correlation matrix, it will not necessarily be picked up in the information hierarchy trees (see step 1270 of FIG. 12). However, as described with respect to the threshold, in practice data is messy and very rarely perfect causing small inconsistencies in the data meaning correlations between fields are not quite perfect. Any difference in correlation measures between two fields (and where one of the directions is above the threshold value) yields an information hierarchy. If a known data subject key field appears in an information hierarchy tree with any other non-data subject key field as a parent of the data subject key in the tree (i.e., if the data subject key field is not the root of a given tree), then the parent node of the data subject key in the tree is also a data subject key (though a secondary one, as defined above). In this manner it is possible to use information hierarchy trees to find potentially unknown or hidden data subject key fields in a dataset, which may not otherwise be obvious.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for automatically extracting latent structures and relationships in datasets to enable a building of information hierarchy trees, the method comprising:

accessing a threshold value;
  extracting a first correlation between a first field of data and a second field of data;
  determining that a strength of the first correlation meets or exceeds the threshold, and, responsive to determining that the strength of the first correlation meets or exceeds the threshold value, extracting a second correlation of the second field to the first field;
  comparing the first correlation and the second correlation to evaluate a two-way relationship between the first field and the second field; and
  determining that the strength of the first correlation is greater than the strength of the second correlation, identifying the second field as a child of the first field, thereby indicating a parent-child relationship between the first field and the second field.

2. The method of claim 1, wherein a correlation includes a descriptive relationship between two fields.

3. The method of claim 1, wherein extracting the first correlation includes receiving a provided description of correlations.

4. The method of claim 3, wherein deciding on the strength of the first correlation includes comparing the correlation to the threshold using the provided description of correlations.

5. The method of claim 4, wherein deciding on the strength of the second correlation includes comparing the second correlation to a second threshold that is the same or different than the threshold.

6. The method of claim 1 wherein the strength of correlation is determined based on at least one of a context of use of a dataset being analyzed and a quality of the dataset.

7. The method of claim 1 wherein the highest threshold value facilitates an understanding of data interchangeability.

8. The method of claim 1 wherein selecting lower than the highest threshold value accounts for imperfections or quality issues within the data, while still facilitating an understanding of data structure and interchangeability but with minimal impact on utility.

9. The method of claim 1 recursively repeated for a plurality of combinations of field pairs in the dataset.

14

10. A system comprising:
  at least one processor programmed to:
  access a threshold value;
  extract extracting a first correlation between a first field and a second field;
  determine a strength of the first correlation;
  if the strength of the first correlation meets or exceeds the threshold, extract a second correlation of the second field to the first field;
  compare the first correlation and the second correlation to evaluate a two-way relationship between the first field and the second field; and
  if the strength of the first correlation is greater than a strength of the second correlation, identify the second field as a child of the first field.

11. The system of claim 10, further comprising the processor is further programmed to:
  build information hierarchy tree via latent structures and relationships in the dataset.

12. The system of claim 10, further comprising the processor is further programmed to: determine the strength of correlation in order to form a parent child relationship in an information hierarchy tree based on a context of use of a dataset and/or a quality of the dataset.

13. The system of claim 10, further comprising the processor is further programmed to: identify the strongest determination of correlation strength, for this strength ensures a perfect mapping exists between a parent and child node.

14. The system of claim 10, wherein the processor is further programmed to: extract the strength of correlation of (A,B) and determining if the strength of correlation of (A,B) is greater than or equal to the threshold, where when the strength of correlation of (A,B) is less than the threshold, field B is not added as a child of A field.

15. The system of claim 10, wherein the processor is further programmed to: extract a strength of correlation of (B,A) and determine whether or not a strength of correlation of (A,B) is greater than the strength of correlation of (B,A), where if the strength of correlation of (A,B) is less than or equal to the strength of correlation of (B,A), field B is not added as a child of field A in an information hierarchy tree and if the determination is affirmative, add field B as a child of field A.

16. The system of claim 10, wherein the processor is further programmed to: automatically extract latent structures and relationships in datasets recursively for a plurality of combinations of field pairs in the dataset.

17. The system of claim 10 wherein (old 10) if the strength of correlation of (A,B) does not meet the threshold, field B is not added as a child of A field.

18. The system of claim 10 wherein if a strength of correlation of (A,B) is insufficient relative to a strength of correlation of (B,A), field B is not added as a child of field A in an information hierarchy tree.

19. The system of claim 10, wherein the processor is further programmed to:
  generate or update an information hierarchy based on the parent-child relationship between the first field and the second field.

20. The system of claim 10, wherein the processor is further programmed to:
  if the strength of the first correlation is greater than the strength of the second correlation, generate or update an information hierarchy comprising a recursive directed graph tree view over an asymmetrical pairwise correlation matrix, wherein graph edges between nodes representing the first field and the second field are defined by correlation values greater than or equal to the threshold, and wherein for the first field is represented in the recursive directed graph tree to have the second field as a child.

* * * * *